United States Patent
Namikawa (10) Patent No.: US 11,965,858 B2
(45) Date of Patent: Apr. 23, 2024

(54) LAMINATED IRON CORE ELASTIC MATRIX DETERMINATION METHOD AND VIBRATION ANALYSIS METHOD

(71) Applicant: JFE STEEL CORPORATION, Tokyo (JP)

(72) Inventor: Misao Namikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 387 days.

(21) Appl. No.: 17/288,781

(22) PCT Filed: Sep. 4, 2019

(86) PCT No.: PCT/JP2019/034741
§ 371 (c)(1),
(2) Date: Apr. 26, 2021

(87) PCT Pub. No.: WO2020/095527
PCT Pub. Date: May 14, 2020

(65) Prior Publication Data
US 2021/0404992 A1    Dec. 30, 2021

(30) Foreign Application Priority Data
Nov. 6, 2018  (JP) .................... 2018-209138

(51) Int. Cl.
*G01N 29/12* (2006.01)
*G01N 29/22* (2006.01)
*H01F 27/24* (2006.01)

(52) U.S. Cl.
CPC ........... *G01N 29/12* (2013.01); *G01N 29/223* (2013.01); *G01N 2291/0231* (2013.01); *G01N 2291/02827* (2013.01); *H01F 27/24* (2013.01)

(58) Field of Classification Search
None
See application file for complete search history.

(56) References Cited

U.S. PATENT DOCUMENTS

2009/0301197 A1* 12/2009 De Smet .............. G01N 29/223
73/587

FOREIGN PATENT DOCUMENTS

| CN | 104359549 B | 7/2015 |
| CN | 106777534 A | 5/2017 |

(Continued)

OTHER PUBLICATIONS

Oct. 6, 2021 Extended European Search Report issued in European Patent Application No. 19881124.2.

(Continued)

*Primary Examiner* — Giovanni Astacio-Oquendo
*Assistant Examiner* — Carl F. R. Tchatchouang
(74) *Attorney, Agent, or Firm* — Oliff PLC (57) ABSTRACT

An elastic matrix determination method for a laminated iron core, which can optimally determine a shear modulus in two planes including a laminating direction of the laminated iron core included in an elastic matrix in a constitutive equation representing a stress-strain relationship used for vibration analysis, and also provided is a vibration analysis method. When performing a vibration analysis of a laminated iron core formed by laminating steel sheets using a constitutive equation representing a stress-strain relationship in a matrix representation, a shear modulus in two planes including a laminating direction of the laminated iron core included in an elastic matrix in the constitutive equation is determined depending on an average tightening pressure in the laminating direction of the laminated iron core.

8 Claims, 8 Drawing Sheets

(56) References Cited

FOREIGN PATENT DOCUMENTS

| | | |
|---|---|---|
| CN | 108629080 A | 10/2018 |
| EP | 3 016 009 A1 | 5/2016 |
| JP | 2010-003154 A | 1/2010 |
| JP | 2013-068517 A | 4/2013 |
| JP | 2014-071689 A | 4/2014 |
| JP | 2017-106893 A | 6/2017 |

OTHER PUBLICATIONS

Dec. 3, 2019 Search Report issued in International Patent Application No. PCT/JP2019/034741.
Oct. 25, 2023 Office Action issued in Chinese Patent Application No. 201980070302.7.

* cited by examiner

LAMINATED IRON CORE ELASTIC MATRIX DETERMINATION METHOD AND VIBRATION ANALYSIS METHOD

TECHNICAL FIELD

The present invention relates to a method for determining an elastic matrix in a constitutive equation representing a stress-strain relationship in elastic deformation of an iron core, in which equation is applied when performing a vibration analysis of a laminated iron core, such as an iron core for transformers, and to a vibration analysis method.

BACKGROUND ART

Transformers such as distribution transformers are configured by winding coils around a laminated iron core formed by laminating electrical steel sheets. Important performances of transformers include core loss (no-load loss) characteristics, excitation current characteristics, noise characteristics, and the like.

Distribution transformers are installed in various places. Particularly, those that are installed in urban areas are strongly required to make low noise. Thus, in recent years, noise characteristics have become particularly more and more important, for example, due to consideration to environments around the locations of transformers installed.

Grain-orientated electrical steel sheets are often used as a material of an iron core for transformers. Grain-orientated electrical steel sheets have material expansion and contraction due to excitation called magnetostriction, and the magnetostrictive vibration under excitation is said to be a main cause of transformer noise. Therefore, transformer noise performance is considered to strongly depend on the magnetostrictive performance of an electrical steel sheet to be used, so that when manufacturing a low noise transformer, an electrical steel sheet having low magnetostrictive characteristics is used as the material of an iron core.

However, it is often the case that sufficient transformer low noise characteristics are not obtained despite of use of an iron core manufactured by actually using an electrical steel sheet excellent in magnetostrictive performance. Investigations on the cause of such a problem have found many cases where it is considered to be due to a resonance phenomenon between a natural frequency of the iron core for transformers and the magnetostrictive vibration of the electrical steel sheet. Accordingly, it is significantly important to calculate and predict mechanical vibration characteristics, such as the natural vibration of an iron core for transformers, in designing and manufacturing a transformer.

Then, an analyzer and an analysis method have been proposed to, on the basis of a numerical analysis model in which an electromagnetic component including a magnetic body that generates magnetostriction is represented by a combination of a plurality of finite elements in finite element analysis, calculate a nodal force equivalent to distortion of each node of the finite elements or each finite element according to a magnetic flux density given to the electromagnetic component (for example, see PTL 1).

CITATION LIST

Patent Literature

PTL 1: JP 2014-71689 A

SUMMARY OF INVENTION

Technical Problem

However, the conventional technology described in PTL 1 above performs quasi static structural analysis by using governing equations for structural analysis including an equilibrium of force, a constitutive equation representing a stress-strain relationship, and a relational equation between displacement and strain.

In general, the constitutive equation representing a relationship between stress tensor $\{\sigma\}$ and strain tensor $\{\varepsilon\}$ is represented by $\{\sigma\}=\{D\}\{\varepsilon\}$ ($\{\ \}$ indicates a tensor).

Here, $\{D\}$ is a tensor representing a strain-stress relationship. Components are as shown in equation (1).

$$\sigma_{ij} = \sum_k \sum_l D_{ijkl} \cdot \varepsilon_{kl} \qquad (1)$$

in which $\{D\}$ has 81 components, and $\{\sigma\}$ and $\{\varepsilon\}$ have 9 components. Here, a tensor as a physical quantity is a symmetric tensor, so that each of $\{\sigma\}$ and $\{\varepsilon\}$ has 6 independent components. Accordingly, when the constitutive equation is expressed in a matrix form by $[\sigma]=[D][\varepsilon]$ ([ ] indicates a matrix; [D] is referred to as elastic matrix), and expressed by components, it is represented by equation (2).

$$\begin{bmatrix} \sigma_{xy} \\ \sigma_{yy} \\ \sigma_{zz} \\ \sigma_{yz} \\ \sigma_{zx} \\ \sigma_{xy} \end{bmatrix} = [D_{ij}] \begin{bmatrix} \varepsilon_{xy} \\ \varepsilon_{yy} \\ \varepsilon_{zz} \\ \varepsilon_{yz} \\ \varepsilon_{zx} \\ \varepsilon_{xy} \end{bmatrix} \qquad (2)$$

In PTL 1, as a relational equation between stress and strain, a relationship between vertical stress $\sigma_i$ and vertical strain $\varepsilon_i$ is expressed using Young's modulus E and Poisson's ratio $\nu$, and a relationship between shear stress $\tau_{ij}$ and shear strain $\gamma_{ij}$ is expressed using shear modulus G, indicating that the elastic matrix can be expressed using the Young's modulus E, the Poisson's ratio $\nu$, and the shear modulus G.

However, in the above conventional technology, there is no description about setting of the elastic matrix [D] and the shear modulus G, and there is also no description about how the elastic matrix [D] and the shear modulus G are determined. Generally, the elastic coefficient of a member itself such as an electrical steel sheet that forms an electromagnetic component to be subjected to structural analysis is often directly applied to the elastic matrix [D] and the shear modulus G.

In this case, it is known that when mechanical vibration results of the electromagnetic component to be subjected to structural analysis are compared with results of actual mechanical vibration measurement, there is a large discrepancy between the calculated value and the actually measured value.

In order to suppress the discrepancy between the calculated value and the actually measured value, it is necessary to produce a prototype of the electromagnetic component to be subjected to structural analysis and measure elastic coefficient thereof, but that does not make sense, and it is difficult to reflect structural analysis by a structural analysis program in the design of the electromagnetic component.

Thus, the present invention has been made in view of the above problem of the conventional technology. It is an object of the present invention to provide an elastic matrix determination method for a laminated iron core that can optimally determine a shear modulus in two planes including a laminating direction of the laminated iron core, in which the shear modulus is included in an elastic matrix in a constitutive equation representing a stress-strain relationship used for vibration analysis, and a vibration analysis method for the laminated iron core.

Solution to Problem

To achieve the above object, an elastic matrix determination method according to one embodiment of the present invention includes, when performing a vibration analysis of a laminated iron core formed by laminating steel sheets using a constitutive equation representing a stress-strain relationship in a matrix representation, determining a shear modulus in two planes including a laminating direction of the laminated iron core included in an elastic matrix in the constitutive equation depending on an average tightening pressure in the laminating direction of the laminated iron core.

Further, a vibration analysis method according to another aspect of the present invention includes performing a vibration analysis of a laminated iron core formed by laminating steel sheets by incorporating the shear modulus determined by the above-described elastic matrix determination method in an elastic matrix of a constitutive equation representing a stress-strain relationship in a matrix representation using a response function.

Advantageous Effects of Invention

According to the elastic matrix determination method for a laminated iron core according to the present invention, the discrepancy between an actually measured value of vibration characteristics and a calculated value thereof can be suppressed by determining, according to the average tightening pressure in the laminating direction of the laminated iron core, the shear modulus in the two planes including the laminating direction of the laminated iron core included in the constitutive equation representing the stress-strain relationship used for vibration analysis.

Further, the vibration analysis method for a laminated iron core according to the present invention can improve accuracy in the vibration analysis by incorporating the suitably determined shear modulus in the structural equation and performing the vibration analysis.

BRIEF DESCRIPTION OF DRAWINGS

FIG. 3 illustrates a state where an iron core for three-phase three-legged transformers illustrated in FIG. 2 is fixed, in which

FIG. 9 is an illustration of characteristics of the laminated iron core to be tested, in which

DESCRIPTION OF EMBODIMENTS

Hereinafter, embodiments of an elastic matrix determination method for a laminated iron core and a vibration analysis method for a laminated iron core according to the present invention will be described with reference to the drawings. Note that the respective drawings are schematic and may differ from reality. Additionally, the following embodiments exemplify devices and methods for embodying the technological ideas of the present invention, and are not intended to limit the structures to those described below. In other words, various modifications can be added to the technological ideas of the present invention within the technological scope described in the claims.

Figure 1:
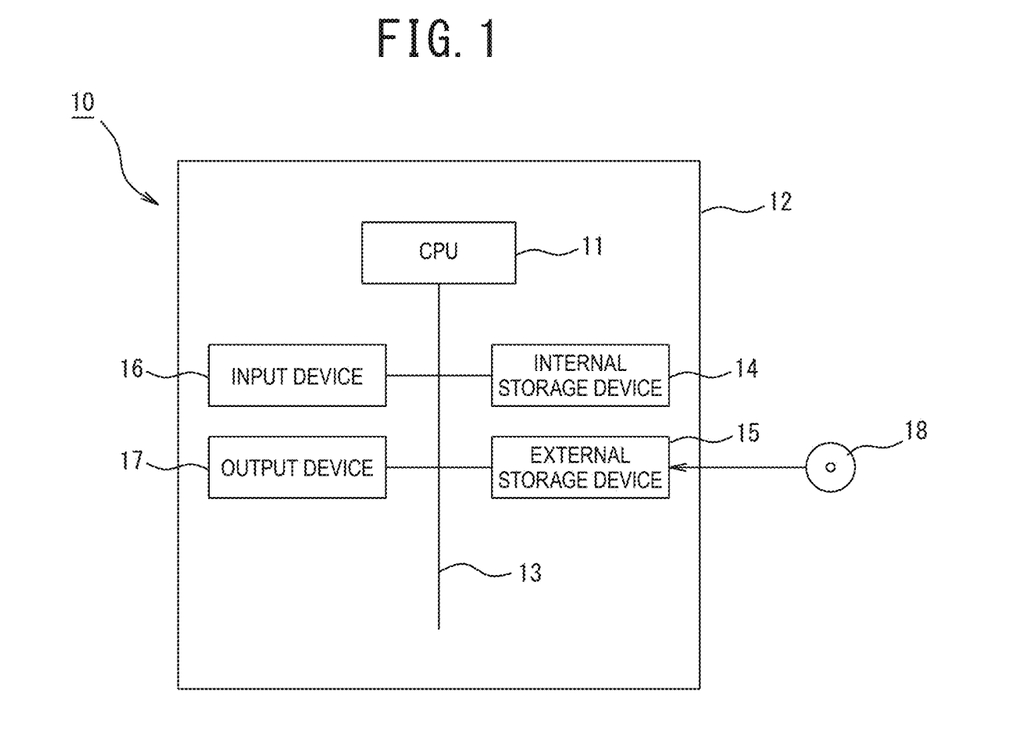
FIG. 1 is a block diagram illustrating a vibration analysis device applicable to the present invention.

As shown in FIG. 1, a vibration analysis device 10 is configured by a computing processing device 12 including a CPU 11. The CPU 11 is connected to, via an internal bus 13, an internal storage device 14 such as RAM or ROM, an external storage device 15, an input device 16 such as a keyboard and a mouse, and an output device 17 that outputs image data to a display.

The external storage device 15 includes a readable disk drive such as a hard disk drive or a solid state drive and a drive device such as a CD, a DVD, or a BD for reading data from a recording medium. A recording medium 18 storing a commercially-available vibration analysis program is set in the external storage device 15, and the vibration analysis program read therefrom is installed into the disk drive. It is noted that installation of the vibration analysis program is not limited to the use of the recording medium 18, and the vibration analysis program may be downloaded via a network.

The CPU 11 performs vibration analysis using a finite element method using analysis input data input in accordance with the installed vibration analysis program, and outputs an analysis result on natural frequency and the like according to vibration mode from the output device 17 to a display, so that the result is displayed. The analysis result is not limited to being displayed on the display, and can be printed by a printer or transmitted via a network.

Figure 2:
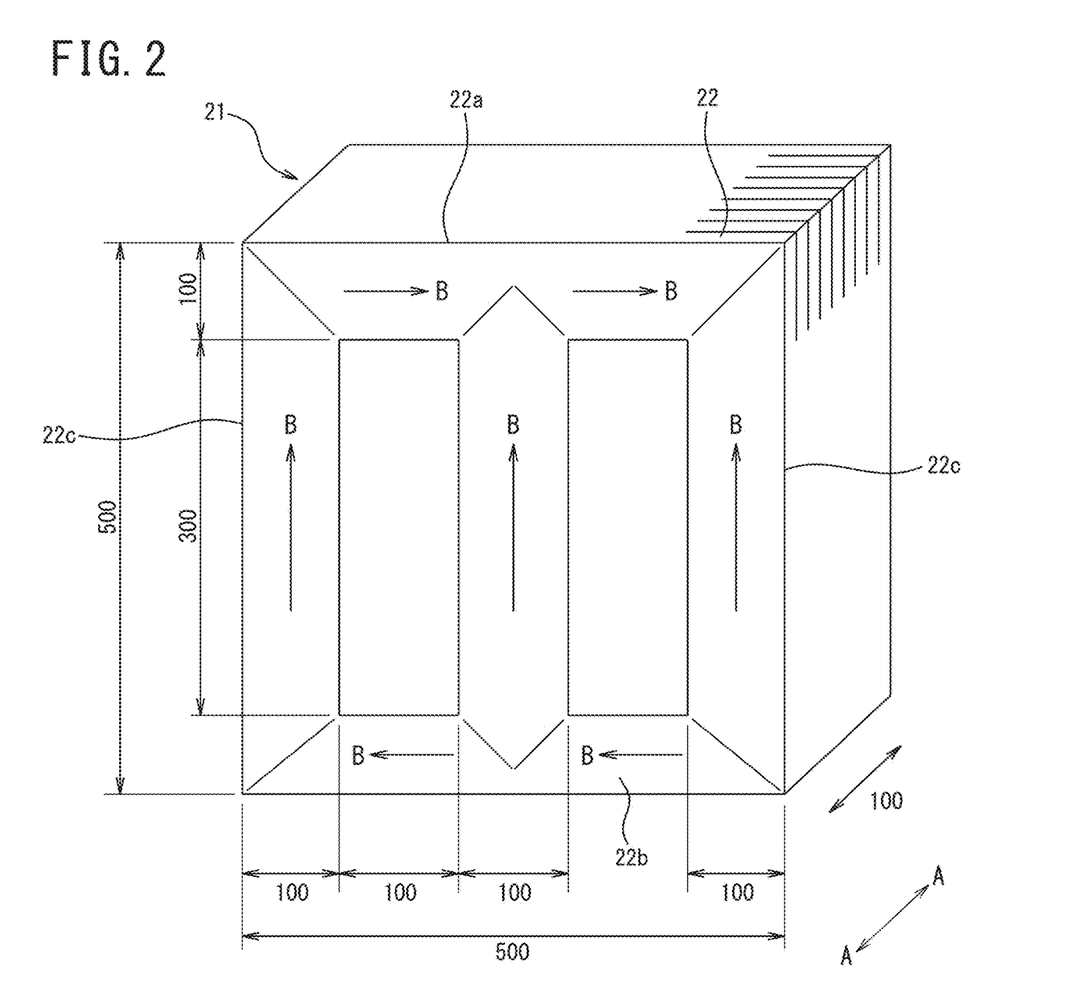
FIG. 2 is a perspective view illustrating an iron core for three-phase three-legged transformers.
Figure 3A:
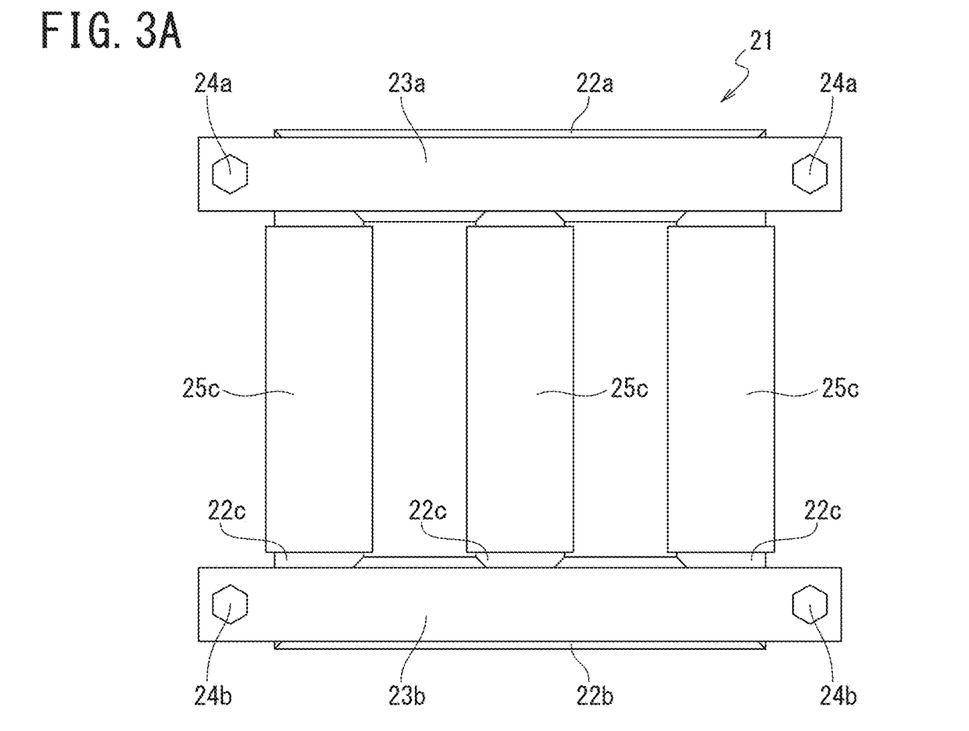
FIG. 3A is a front view.
Figure 3B:
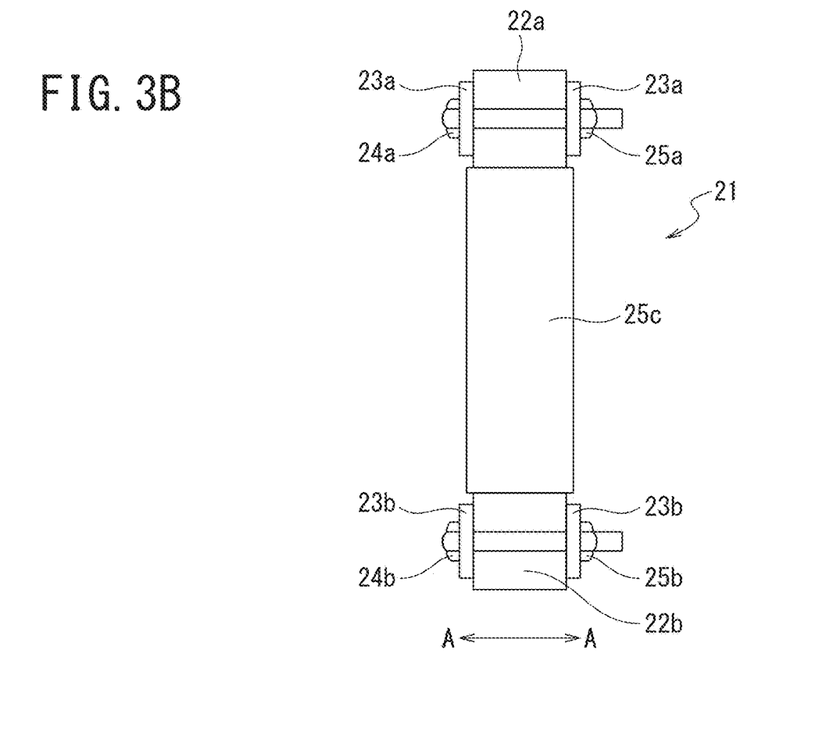
FIG. 3B is a right side view.

The laminated iron core to be analyzed in the present embodiment is, for example, a laminated iron core 21 for three-phase three-legged transformers (a laminated iron core for transformers) used as a distribution transformer, and has a structure in which three leg portions 22c are connected between an upper yoke portion 22a and a lower yoke portion 22b, as illustrated in FIG. 2. In the laminated iron core 21 for three-phase three-legged transformers illustrated in FIG. 2, for example, 333 grain-orientated electrical steel sheets 22 having a sheet thickness of 0.3 mm are laminated in a laminating direction indicated by an arrow A so that rolling directions (directions of axes of easy magnetization indicated by arrows B in FIG. 2) of the steel sheets are aligned. Then, as illustrated in FIGS. 3A and 3B, the upper yoke portion 22a is fixed by placing a pair of upper backing plates 23a on both end faces in the laminating direction and tightening them with bolts 24a and nuts 25a in the laminating direction. Additionally, the lower yoke portion 22b is fixed by placing a pair of lower backing plates 23b on both end faces in the laminating direction and tightening them with bolts 24b and nuts 25b in the laminating direction. Furthermore, each leg portion 22c is tightened and fixed in the laminating direction by wrapping a glass tape 25c therearound or placing backing plates as illustrated in the drawing on both end faces in the laminating direction and tightening them with bolts and nuts in the laminating direction.

It is noted that for the sake of illustration, an example of a laminated iron core fixing method has been described. However, the laminated iron core fixing method to which the present invention is applicable is not limited to the illustrated fixing method. For example, the present invention is also applicable to iron cores fixed by methods that are currently commonly used to fix an iron core, such as an iron core with yoke portions and leg portions both fixed with a glass tape, an iron core fixed by passing bolts through through-holes formed in the iron core, and an iron core fixed with a band of non-magnetic metal.

As one example, dimensions of the upper yoke portion 22a and the lower yoke portion 22b are set to 100 mm in width×500 mm in length. Further, dimensions of the three leg portions 22c are set to 100 mm in width×300 mm in length, and connected at intervals of 100 mm between the upper yoke portion 22a and the lower yoke portion 22b.

In performing a vibration analysis of such a laminated iron core 21 for three-phase three-legged transformers, there is used a constitutive equation representing a stress-strain relationship, which is a governing equation for structural analysis.

The constitutive equation is represented by the following equation (3), where a laminate is replaced with an equivalent homogeneous body and the influence of lamination is expressed by matrix physical properties:

$$[\sigma] = [C][\varepsilon] \quad (3)$$

Here, [σ] is a stress matrix, [C] is an elastic matrix (stiffness matrix) as a response function, and [ε] is a strain matrix.

Figure 4A:
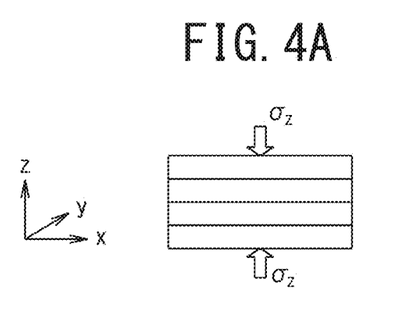
FIG. 4A is a diagram illustrating a vertical stress $\sigma z$ in the Z direction.
Figure 4B:
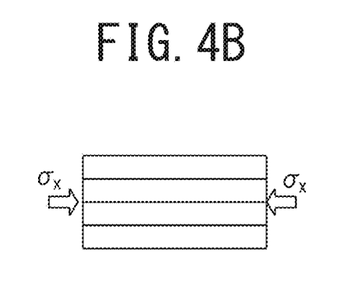
FIG. 4B is a diagram illustrating a vertical stress $\sigma x$ in the X direction.
Figure 4C:
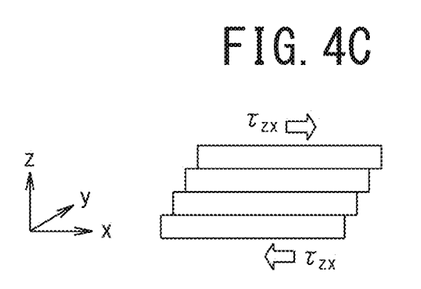
FIG. 4C is a diagram illustrating a shear stress $\tau zx$ in a ZX plane.
Figure 4D:
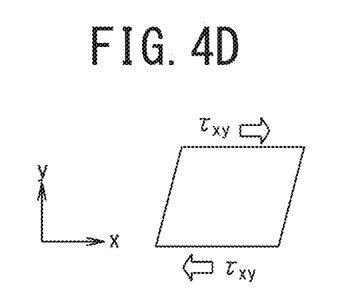
FIG. 4D is a diagram illustrating a shear stress $\tau xy$ in a XY plane.

Here, it is assumed that the laminating direction of the steel sheets is Z direction, one of two-dimensional planes orthogonal to the Z direction is X direction, and the other one thereof is Y direction. As illustrated in FIGS. 4A-4D, vertical components of the stress matrix [σ] are represented by a vertical stress σx in the X direction (FIG. 4B), a vertical stress σy in the y direction (not shown), and a vertical stress σz in the Z direction (FIG. 4A). Further, shear components thereof are represented by a shear stress τzx in a ZX plane (FIG. 4C), a shear stress τyz in a YZ plane (not shown), and a shear stress τxy in a XY plane (FIG. 4D).

Similarly, vertical components of the strain matrix [ε] are represented by a vertical stress εx in the X direction, a vertical stress εy in the y direction, and a vertical stress εz in the Z direction. In addition, shear components thereof are represented by a shear stress γzx in a ZX plane, a shear stress γyz in a YZ plane, and a shear stress γxy in a XY plane.

Furthermore, the elastic matrix [C] is represented by 36 elastic coefficients $C_{ij}$ (i=1 to 6, and j=1 to 6).

The matrix representation of these is as shown in the following equation (4).

$$\begin{bmatrix} \sigma_x \\ \sigma_y \\ \sigma_z \\ \hline \tau_{yz} \\ \tau_{zx} \\ \tau_{xy} \end{bmatrix} = \begin{bmatrix} C_{11} & C_{12} & C_{13} & C_{14} & C_{15} & C_{16} \\ C_{12} & C_{22} & C_{23} & C_{24} & C_{25} & C_{26} \\ C_{13} & C_{23} & C_{33} & C_{34} & C_{35} & C_{36} \\ \hline C_{14} & C_{24} & C_{34} & C_{44} & C_{45} & C_{46} \\ C_{15} & C_{25} & C_{35} & C_{45} & C_{55} & C_{56} \\ C_{16} & C_{26} & C_{36} & C_{46} & C_{56} & C_{66} \end{bmatrix} \begin{bmatrix} \varepsilon_x \\ \varepsilon_y \\ \varepsilon_z \\ \hline \gamma_{yz} \\ \gamma_{zx} \\ \gamma_{xy} \end{bmatrix} \quad (4)$$

↑VERTICAL COMPONENTS
↓SHEAR COMPONENTS

The laminated iron core 21 for three-phase three-legged transformers is manufactured by laminating the grain-orientated electrical steel sheets 22. Therefore, the laminated iron core 21 has mechanical symmetry, and also has 180 degree symmetry in a longitudinal direction of the laminated steel sheets and in a direction perpendicular to the longitudinal direction, so that it has orthogonal anisotropy as an anisotropy classification. Thus, an object having orthogonal anisotropy can be basically represented by a total of 9 elastic coefficients $C_{11}$, $C_{12}$, $C_{13}$, $C_{22}$, $C_{23}$, $C_{33}$, $C_{44}$, $C_{55}$, $C_{66}$ and as shown in the following equation (5).

$$\begin{bmatrix} \sigma_x \\ \sigma_y \\ \sigma_z \\ \hline \tau_{yz} \\ \tau_{zx} \\ \tau_{xy} \end{bmatrix} = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ \hline 0 & 0 & 0 & C_{44} & 0 & 0 \\ 0 & 0 & 0 & 0 & C_{55} & 0 \\ 0 & 0 & 0 & 0 & 0 & C_{66} \end{bmatrix} \begin{bmatrix} \varepsilon_x \\ \varepsilon_y \\ \varepsilon_z \\ \hline \gamma_{yz} \\ \gamma_{zx} \\ \gamma_{xy} \end{bmatrix} \quad (5)$$

↑VERTICAL COMPONENTS
↓SHEAR COMPONENTS $$C_{11} = \frac{1 - \nu_{yz}\nu_{zy}}{E_y E_z \Delta} \quad (6)$$

$$C_{12} = \frac{\nu_{yx} + \nu_{zx}\nu_{yz}}{E_y E_z \Delta} \quad (7)$$

$$C_{13} = \frac{\nu_{zx} + \nu_{yx}\nu_{zy}}{E_y E_z \Delta} \quad (8)$$

$$C_{22} = \frac{1 - \nu_{xz}\nu_{zx}}{E_z E_x \Delta} \quad (9)$$

$$C_{23} = \frac{\nu_{zy} + \nu_{xy}\nu_{zx}}{E_x E_y \Delta} \quad (10)$$

$$C_{33} = \frac{1 - \nu_{xy}\nu_{yx}}{E_x E_y \Delta} \quad (11)$$

$$\Delta = \frac{1 - \nu_{xy}\nu_{yx} - \nu_{xz}\nu_{zx} - \nu_{xy}\nu_{yz} - 2\nu_{yx}\nu_{zy}\nu_{zx}}{E_x E_y E_z} \quad (12)$$

Among them, the elastic coefficients $C_{11}$, $C_{12}$, $C_{13}$, $C_{22}$, $C_{23}$, and $C_{33}$ can be calculated by equations (6) to (12) according to elastic moduli Ex, Ey, and Ez and Poisson's ratios vxy, vyx, vyz, vzy, vzx, vxz.

Further, the elastic coefficient $C_{44}$ is a shear modulus Gyz in the YZ plane, the elastic coefficient $C_{55}$ is a shear modulus Gzx in the ZX plane, and the elastic coefficient $C_{66}$ is a shear modulus Gxy in the XY plane.

Here, Ex is the elastic modulus (Young's modulus) in the X direction, Ey is the elastic modulus (Young's modulus) in the Y direction, and Ez is the elastic modulus (Young's modulus) in the Z direction. In addition, vxy is the Poisson's ratio (indicating the ratio of a longitudinal strain in the X direction to a lateral strain in the Y direction) in the XY plane, vyx is the Poisson's ratio (indicating the ratio of a longitudinal strain in the Y direction to a lateral strain in the X direction) in the YX plane, vyz is the Poisson's ratio in the YZ plane, vzy is the Poisson's ratio in the ZY plane, vzx is the Poisson's ratio in the ZX plane, and vxz is the Poisson's ratio in the XZ plane.

Then, a relationship between equations (13) to (15) called reciprocity theorem holds between elastic modulus and Poisson's ratio.

$$\frac{v_{xy}}{E_x} = \frac{v_{yx}}{E_y} \quad (13)$$

$$\frac{v_{yz}}{E_y} = \frac{v_{zy}}{E_z} \quad (14)$$

$$\frac{v_{zx}}{E_z} = \frac{v_{xz}}{E_x} \quad (15)$$

Therefore, the Poisson's ratio vyx in the YX plane can be represented by using Ex, Ey, and vxy, the Poisson's ratio vzy in the ZY plane can be represented using Ey, Ez, and vyz, and the Poisson's ratio vxz in the XZ plane can be represented using Ez, Ex, and vzx.

Thus, the values of the total of nine elastic coefficients $C_{11}$, $C_{12}$, $C_{13}$, $C_{22}$, $C_{23}$, $C_{33}$, $C_{44}$, $C_{55}$, and $C_{66}$ representing the elastic matrix of the object having orthogonal anisotropy can be represented by using a total of nine mechanical property values: the elastic moduli Ex, Ey, and Ez, the shear moduli Gyz, Gzx, and Gxy, and the Poisson's ratios vxy, vyz, and vzx. Accordingly, since determining the total of nine mechanical property values is equivalent to determining the total of nine elastic coefficients representing the elastic matrix, the following description will be given of a method for determining the elastic moduli Ex, Ey, and Ez, the shear moduli Gyz, Gzx, and Gxy, and the Poisson's ratios vxy, vyz, and vzx.

Regarding the elastic moduli of the laminated iron core 21 having orthogonal anisotropy, the elastic moduli Ex and Ey can be set equal to elastic moduli Ex0 and Ey0 of one steel sheet, but the elastic modulus Ez cannot be set substantially equal to an elastic modulus Ez0 of one steel sheet.

The reason is that there is a small gap between the laminated steel sheets. In the present embodiment, an experiment has been conducted to obtain the elastic modulus Ez from a load-displacement relationship in the laminating direction of the laminated steel sheets, and has found that the elastic module Ez has a value around 10 GPa. Therefore, elastic modulus Ez=10 GPa was set. However, in the present embodiment, the influence of a magnitude of the value of the elastic modulus Ez in the laminating direction on a result of vibration calculation is small. Thus, the elastic modulus Ez does not have to be particularly limited to the above value, and even if it is set equal to the elastic modulus Ez0 of one steel sheet, the error does not become so large.

Further, regarding the Poisson's ratio of the laminated iron core 21 having orthogonal anisotropy, the Poisson's ratio vxy can be set equal to a Poisson's ratio vxy0 of one steel sheet, but the Poisson's ratios vyz and vzx cannot be set to Poisson's ratios vyz0 and vzx0 as they are.

The reason is that, in the laminated iron core 21, a mechanical coupling between strain in the laminating direction and strain in a direction perpendicular to the laminating direction seems to be extremely weak. Although it is very difficult to actually measure the Poisson's ratios vyz and vzx, it is expected that the values thereof will be extremely small from the above perspective. Therefore, in the present embodiment, the Poisson's ratios vyz=vzx=0 (vzy=vxz=0 from the reciprocity theorem).

Furthermore, regarding the shear modulus of the laminated iron core 21 having orthogonal anisotropy, the shear modulus Gxy in the XY plane can be set equal to a shear modulus Gxy0 of one steel sheet, but the shear modulus Gzx in the ZX plane and the shear modulus Gyz in the YZ plane cannot be set to shear moduli Gzx0 and Gyz of one steel sheet as they are.

The reason is that slippage occurs in the X direction and the Y direction orthogonal to the laminating direction at an interface between the respective laminated steel sheets, and it is therefore necessary to reflect the influence of the slippage in the shear moduli Gzx and Gyz.

Accordingly, in the elastic matrix, it is important to determine the shear modulus Gzx in the ZX plane and the shear modulus Gyz in the YZ plane in the vibration analysis using the relational expression between stress and strain of the laminated iron core.

Notwithstanding, in order to set the shear modulus Gzx in the ZX plane and the shear modulus Gyz in the YZ plane to values reflecting the influence of the slippage between the steel sheets, the laminated iron core 21 for three-phase three-legged transformers needs to be actually manufactured, and the shear moduli Gzx and Gyz need to be accurately measured. However, if an actually measured natural frequency of the manufactured laminated iron core 21 for three-phase three-legged transformers does not match a target natural frequency, the iron core needs to be manufactured again. It is difficult to repeat the above process to manufacture an iron core having a natural frequency that matches the target natural frequency.

Figure 5:
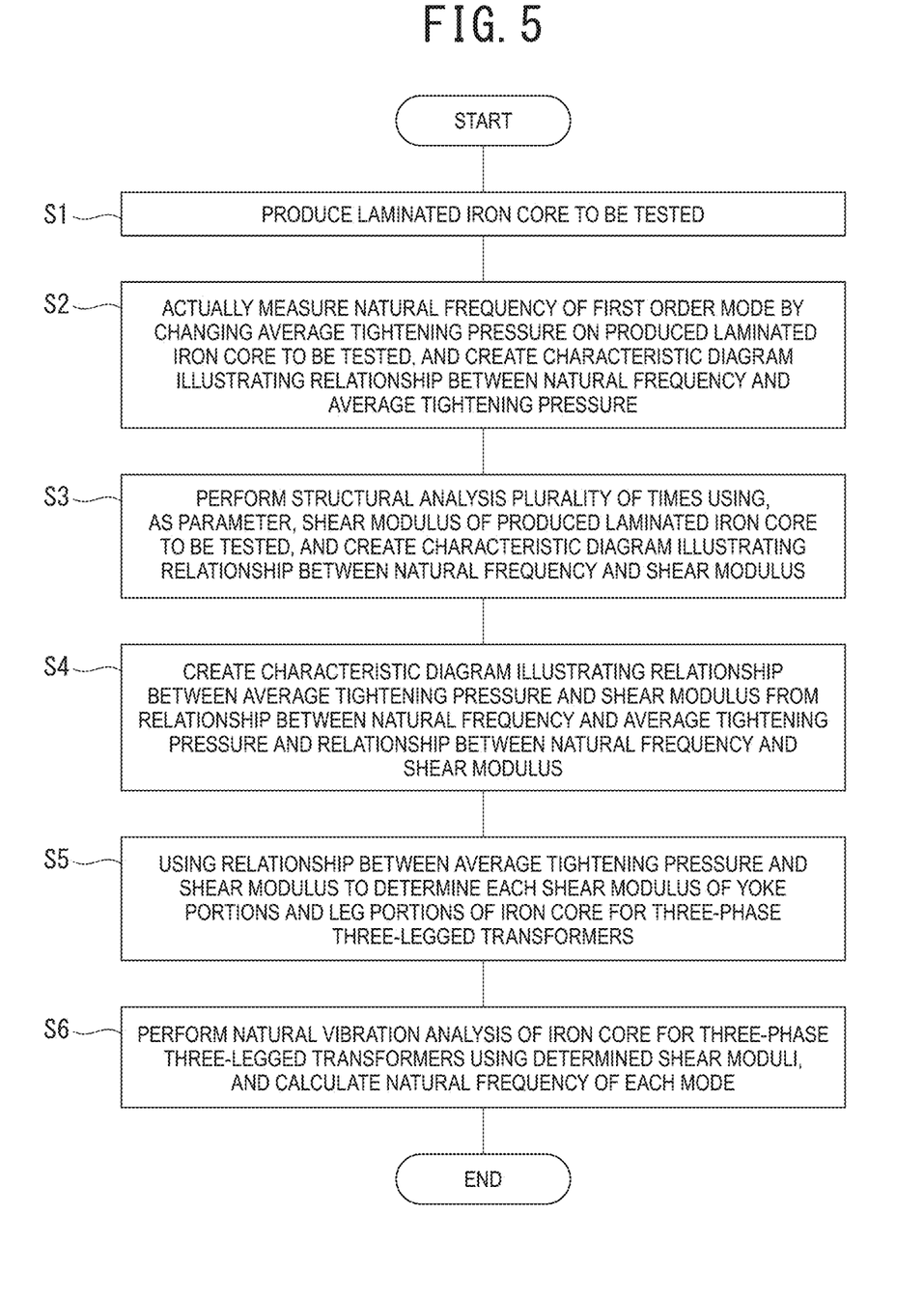
FIG. 5 is a flowchart illustrating a procedure of a method for determining a shear modulus in a structural equation for a laminated iron core.

Thus, the present embodiment performs the elastic matrix determination method according to a procedure illustrated in FIG. 5 to determine the shear modulus in consideration of the slippage between the laminated electrical steel sheets.

Figure 6:
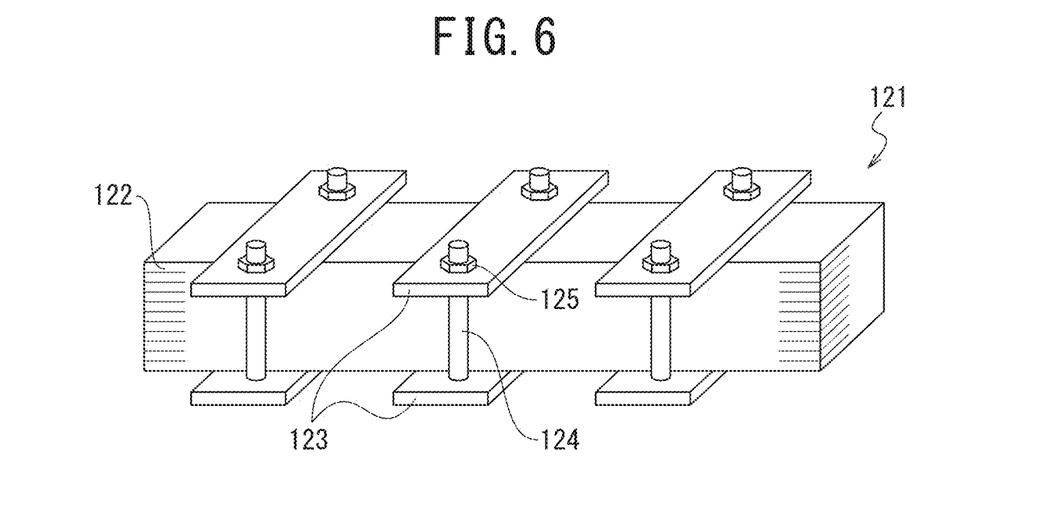
FIG. 6 is a perspective diagram illustrating a state where a laminated iron core to be tested is fixed by backing plates.

In order to determine the elastic matrix, first, as a first step, a laminated iron core to be tested 121 (see FIG. 6) using the same electrical steel sheets as those of the iron core is produced instead of manufacturing the iron core itself (step S1). For example, as illustrated in FIG. 6, for example, 300 grain-orientated electrical steel sheets 122 having a thickness of 0.3 mm, a width of 30 mm, and a length of 280 mm are laminated, and fixed by placing three pairs of backing plates 123 on both surfaces in a laminating direction at equal intervals in a length direction and tightening them with bolts 124 and nuts 125 in the laminating direction. As a result, the laminated iron core to be tested 121 having a rectangular parallelepiped shape is produced. In this case, an average tightening pressure in the laminating direction on the laminated iron core to be tested 121 is configured to be able to be set to an optional value by changing a tightening torque of the bolts 124.

Here, the shape of the laminated iron core to be tested 121 is not limited to a rectangular parallelepiped. Not only a rectangular parallelepiped shape, but also a shape with round corners or a shape partially having a notch or a cut may be used, and the shape thereof does not have to be a rectangular parallelepiped. Alternatively, an iron core formed by laminating elliptical electrical steel sheets may be used.

Figure 7:
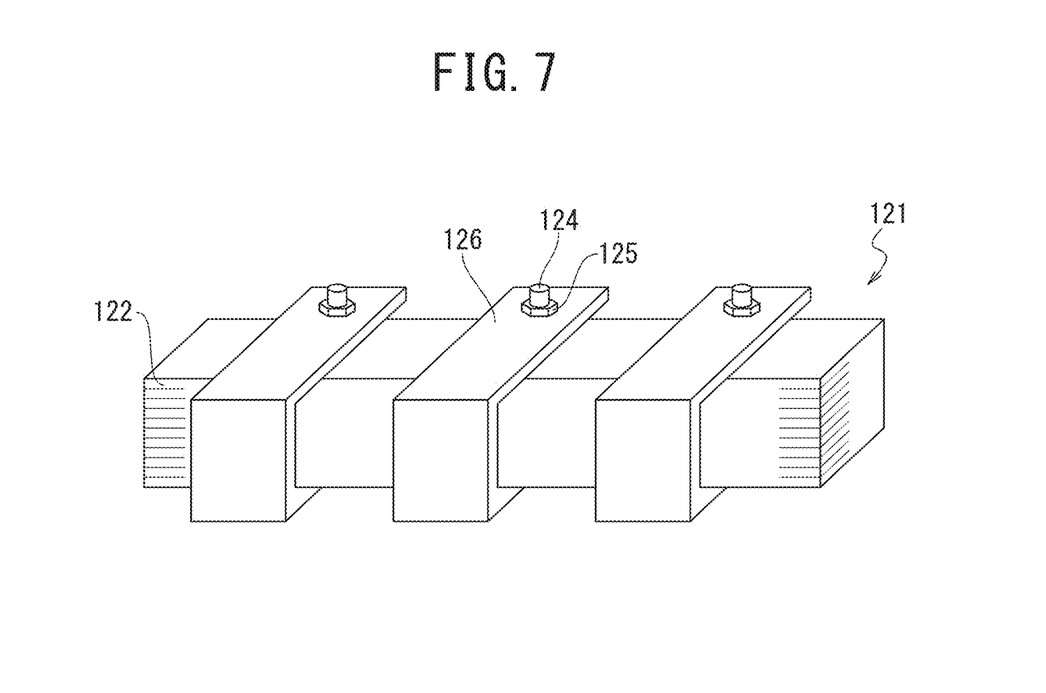
FIG. 7 is a perspective diagram illustrating a state where a laminated iron core to be tested is fixed with clamps.

Further, as illustrated in FIG. 7, in producing the laminated iron core to be tested 121, a plurality of the grain-orientated electrical steel sheets 122 are laminated, and both surfaces in the laminating direction of the laminate are clamped with three clamps 126 from a side of the laminated grain-orientated electrical steel sheets 122 at equal intervals in a length direction. Then, both ends of each clamp 126 may be tightened and fixed with the bolts 124 and the nuts 125 in the laminating direction.

It is noted that FIGS. 6 and 7 each illustrate one example of the laminated iron core fixing method, but the laminated iron core fixing method to which the present invention is applicable is not limited to the illustrated methods. The fixing method can be any method as long as it can pressurize the laminated iron core substantially uniformly in the laminating direction and can control applied pressure. The number of the backing plates is not limited to three pairs, and also, the number of the clamps is not limited to three. Additionally, when clamping with each clamp, the direction of an opening of the each clamp is not particularly limited.

Hereinafter, details of the present invention will be described by assuming that the laminated iron core to be tested 121 is a rectangular parallelepiped iron core.

Next, as a second step, an acceleration sensor is attached to the produced laminated iron core to be tested 121, and while variously changing the average tightening pressure on the laminated iron core to be tested 121, the laminated iron core to be tested 121 is hit and excited by an impact hammer to perform a natural frequency measurement (experimental mode analysis), thereby actually measuring the natural frequency of a deformation first order mode for displacement in the laminating direction. Then, a relationship between the natural frequency of the first order mode and the average tightening pressure is obtained to create a characteristic diagram illustrated in FIG. 9A (step S2).

Figure 9A:
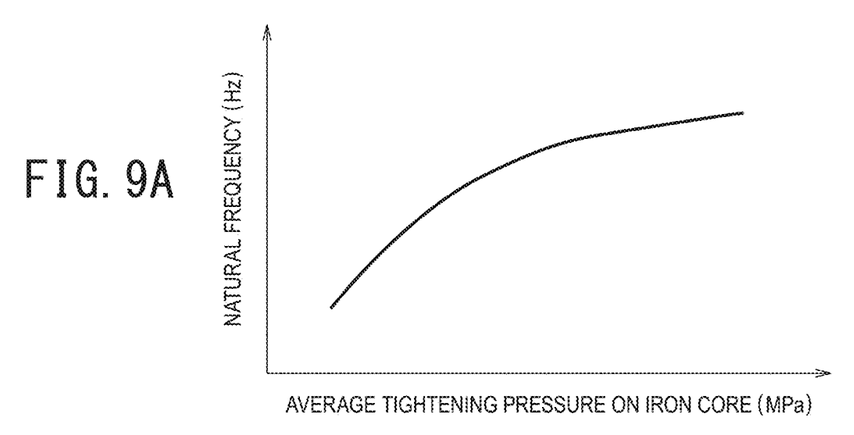
FIG. 9A is a characteristic diagram illustrating a relationship between a first order mode natural frequency of a laminated iron core to be tested and average tightening pressure.

In the characteristic diagram illustrated in FIG. 9A, the horizontal axis represents the average tightening pressure in the laminating direction of the laminated iron core to be tested 121, and the vertical axis represents the natural frequency. The characteristic diagram illustrates the relationship between the natural frequency of a deflection vibration first order mode of the laminated iron core to be tested 121 whose both ends are free and the average tightening pressure on the laminated iron core to be tested 121.

The fixing method for the laminated iron core to be tested 121 may be appropriately selected according to the shape and weight of the iron core. For example, it is preferable for experimental accuracy to measure with both ends of the iron core free by, for example, hanging the iron core with a wire or placing the iron core on a sponge-like object, but the iron core may be supported at both ends thereof. Alternatively, one end of the laminated iron core to be tested 121 may be fixed, and the other end thereof may be left free.

Various vibration modes are excited by hitting and excitation by the impact hammer. However, in the case of a laminated iron core, a deflection deformation mode that is displaced in the laminating direction characteristically appears in a low natural frequency range. Since natural frequency can be measured with high accuracy even when the number of sensors attached to the iron core is small, the present invention prefers the deflection deformation first order mode that is displaced in the laminating direction as a vibration mode for obtaining the natural frequency. However, as long as the measurement accuracy is ensured, the vibration mode therefor may be a higher order deflection deformation mode or may be a torsional deformation mode.

Further, while the hitting and excitation method by the impact hammer has been described as a method for obtaining the natural frequency, there may be used another method for obtaining the natural frequency, such as a method of sweeping and exciting the iron core by using an exciter to obtain the natural frequency.

Next, as a third step, a natural vibration analysis of the laminated iron core to be tested 121 is performed using structural analysis software installed in the vibration analysis device 10. Here, seven out of the total of nine mechanical property values: the elastic moduli $E_x$, $E_y$, and $E_z$, the shear moduli $G_{yz}$, $G_{zx}$, and $G_{xy}$, and the Poisson's ratios $v_{xy}$, $v_{yz}$, and $v_{zx}$ of the laminated iron core to be tested 121 are set as follows:

$E_x = E_{x0}$, $E_y = E_{y0}$, and $E_z = 10$ GPa;

$G_{xy} = G_{xy0}$; and $v_{xy} = v_{xy0}$ and $v_{yz} = v_{zx} = 0$, as described above. Then, the remaining two shear moduli are set to $G_{yz} = G_{zx} = G$, and with various changes in the value of G used as a parameter, structural analysis is performed a plurality of times to obtain a relationship between the natural frequency of the deflection deformation first order mode and the shear modulus G, thereby creating a characteristic diagram illustrated in FIG. 9B (step S3).

Figure 9B:
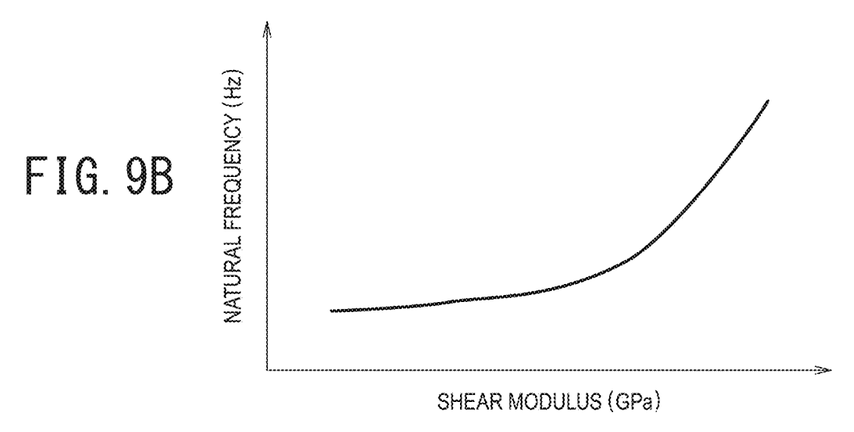
FIG. 9B is a characteristic diagram illustrating a relationship between a first order mode natural frequency of a laminated iron core to be tested and shear modulus.

In the characteristic diagram illustrated in FIG. 9B, the horizontal axis represents the shear modulus G, and the vertical axis represents the natural frequency. The characteristic diagram illustrates the relationship between the natural frequency of the deflection vibration first order mode of the laminated iron core to be tested 121 whose both ends are free and the shear modulus G of the laminated iron core to be tested 121.

Next, as a fourth step, from the relationship between the natural frequency and the average tightening pressure obtained at step S2 (FIG. 9A) and the relationship between the natural frequency and the shear modulus G obtained at step S3 (FIG. 9B) regarding the deflection deformation first order mode displaced in the laminating direction of the laminated iron core to be tested 121, a characteristic diagram (FIG. 9C) illustrating a relationship between the average tightening pressure and the shear modulus G is created (step S4).

Figure 9C:
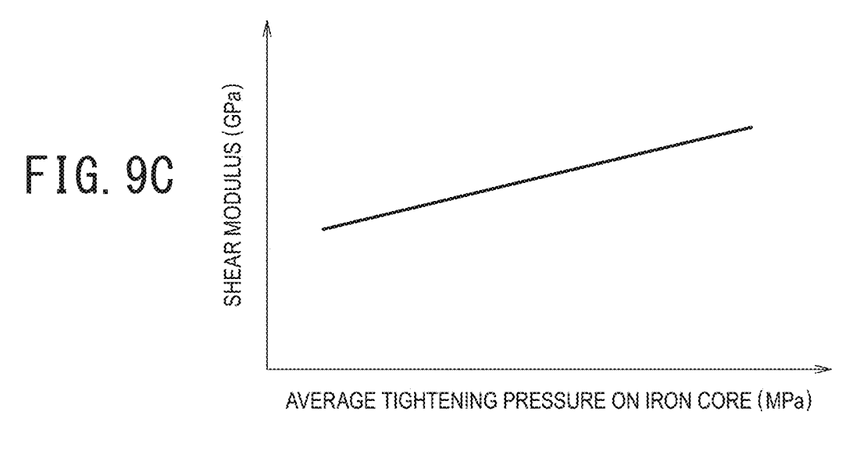
FIG. 9C is a characteristic diagram illustrating a relationship between an average tightening pressure on a laminated iron core to be tested and a shear modulus.

In the characteristic diagram illustrated in FIG. 9C, the horizontal axis represents the average tightening pressure on the laminated iron core to be tested 121, and the vertical axis represents the shear modulus G. The characteristic diagram illustrates the relationship between the average tightening pressure on the laminated iron core to be tested 121 and the shear modulus G of the laminated iron core to be tested 121.

Next, as a fifth step, by using the relationship between the average tightening pressure and the shear modulus G obtained at step S4, a shear modulus of each of the upper yoke portion 22a, the lower yoke portion 22b, and the leg portions 22c is determined according to an average tightening pressure in the laminating direction on each of the upper yoke portion 22a, the lower yoke portion 22b, and the leg portions 22c of the laminated iron core 21 for three-phase three-legged transformers illustrated in FIG. 2, which is to be analyzed in the present embodiment (step S5).

In the laminated iron core 21 for three-phase three-legged transformers illustrated in FIG. 2, which is to be analyzed in the present embodiment, the upper yoke portion 22a is fixed by placing the pair of upper backing plates 23a on both end faces in the laminating direction and tightening them with the bolts 24a and the nuts 25a in the laminating direction. Additionally, the lower yoke portion 22b is fixed by placing the pair of lower backing plates 23b on both end faces in the laminating direction and tightening them with the bolts 24b and the nuts 25b in the laminating direction. Furthermore, the each leg portion 22c is tightened and fixed in the laminating direction by, for example, wrapping the glass tape 25c therearound. Therefore, the average tightening pressure is not necessarily equal between the upper and lower yoke portions 22a and 22b and the leg portions 22c.

For example, when manufacturing the laminated iron core 21 having an average tightening pressure of 0.2 MPa on the upper yoke portion 22a and the lower yoke portion 22b and 0.12 MPa on the leg portions 22c, use of the characteristic diagram illustrated in FIG. 9C created at step S4 enables it to determine that the shear modulus G of the upper yoke portion 22a and the lower yoke portion 22b is 0.25 GPa, and the shear modulus G of the leg portions 22c is 0.15 GPa. In other words, the upper and lower yoke portions 22a and 22b and the leg portions 22c of the laminated iron core 21 for transformers are each given a different shear modulus as having different mechanical property values.

Next, as a sixth step, a natural vibration analysis of the laminated iron core 21 for three-phase three-legged transformers having the shape illustrated in FIG. 2 is performed using the structural analysis software installed in the vibration analysis device 10 to calculate a natural frequency of each mode (step S6). Among the mechanical elastic coefficients of the laminated iron core 21 for three-phase three-legged transformers, the shear moduli Gyz and Gzx are the values determined by the above-described elastic matrix determination method, and the other elastic coefficients and the Poisson's ratio values are as follows: Ex=Ex0, Ey=Ey0, Ez=10 GPa, Gxy=Gxy0, vxy=vxy0, vyz=vzx=0. These are incorporated in the above equation (5) to perform calculation.

For example, as described above, when manufacturing the laminated iron core 21 having the average tightening pressure of 0.2 MPa on the upper yoke portion 22a and the lower yoke portion 22b and 0.12 MPa on the leg portions 22c, it can be determined that the shear modulus G of the upper yoke portion 22a and the lower yoke portion 22b is 0.25 GPa, and the shear modulus G of the leg portions 22c is 0.15 GPa. In this case, in the upper yoke portion 22a and the lower yoke portion 22b of the laminated iron core 21, Ex=Ex0, Ey=Ey0, and Ez=10 GPa
Gxy=Gxy0, and Gyz=Gzx=0.25 GPa
vxy=vxy0, and vyz=vzx=0; and in each leg portion 22c of the laminated iron core 21,
Ex=Ex0, Ey=Ey0, and Ez=10 GPa
Gxy=Gxy0, and Gyz=Gzx=0.15 GPa
vxy=vxy0, and vyz=vzx=0, which are incorporated in the above equation (5) to perform calculation.

Figure 8:
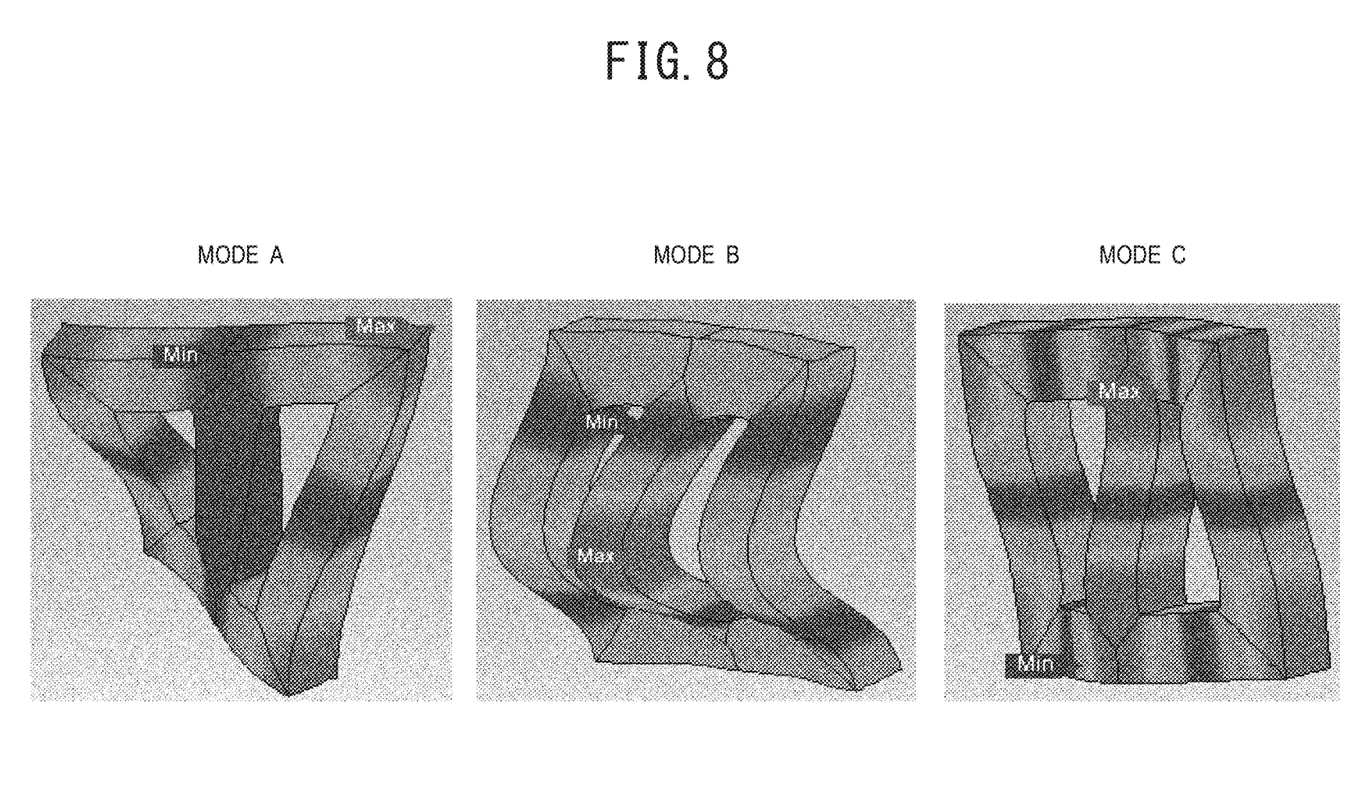
FIG. 8 is a schematic diagram illustrating natural vibration modes of an iron core for three-phase three-legged transformers.

As a result, it can be seen that there are three natural vibration modes: mode A in which left and right magnetic legs are twisted in opposite directions with respect to a center magnetic leg illustrated in FIG. 8, mode B in which the three magnetic legs buckle, and mode C in which the upper yoke is curved rearward and the lower yoke buckles forward, and the natural frequency in each mode can be calculated.

EXAMPLE

It was decided to manufacture the laminated iron core 21 for three-phase three-legged transformers having the dimensions illustrated in FIG. 2 using grain-orientated electrical steel sheets having a sheet thickness of 0.3 mm. Then, as illustrated in FIGS. 3A and 3B, the upper yoke portion 22a was fixed by placing the pair of upper backing plates 23a on both end faces in the laminating direction and tightening them with the bolts 24a and the nuts 25a in the laminating direction, the lower yoke portion 22b was fixed by placing the pair of lower backing plates 23b on both end faces in the laminating direction and tightening them with the bolts 24b and the nuts 25b in the laminating direction, and additionally, each leg portion 22c was fixed by placing unillustrated backing plates on both end faces in the laminating direction and tightening them with bolts and nuts in the laminating direction. The average tightening pressure on the laminated iron core 21 was 0.2 MPa on the upper yoke portion 22a and the lower yoke portion 22b and 0.12 MPa on each leg portion 22c.

Then, when manufacturing the laminated iron core 21 for three-phase three-legged transformers to be analyzed illustrated in FIG. 2, first, as illustrated in FIG. 6, 330 cut sheets of the grain-orientated electrical steel sheet 122 having a sheet thickness of 0.3 mm, a width of 100 mm, and a length of 500 mm were laminated. Then, the laminate was fixed by placing a pair of backing plates 123 on both surfaces in the laminating direction and tightening them with bolts 124 and nut 125 in the laminating direction to produce the rectangular parallelepiped laminated iron core to be tested 121. Then, both ends in the length direction of the rectangular parallelepiped laminated iron core to be tested 121 were hung with wires, and end faces thereof were left free. Regarding the tightening pressure on the iron core, while changing the average tightening pressure from 0.05 MPa to 0.4 MPa by controlling the tightening force of the bolts 124 by a torque wrench, the experiment was conducted.

Next, an acceleration sensor was attached to the produced laminated iron core to be tested 121. Then, the laminated iron core to be tested 121 was hit and excited by an impact hammer while variously changing the average tightening pressure on the laminated iron core to be tested 121 to perform natural frequency measurement (experimental mode analysis), thereby actually measuring the natural frequency of the deformation first order mode for displacement in the laminating direction. Then, the relationship between the natural frequency of the first order mode and the average tightening pressure was obtained to create the characteristic diagram illustrated in FIG. 9A.

Next, the natural vibration analysis of the laminated iron core to be tested 121 was performed using the structural analysis software installed in the vibration analysis device 10. Here, seven out of the total of nine mechanical property values: the elastic moduli Ex, Ey, and Ez, the shear moduli Gyz, Gzx, and Gxy, and the Poisson's ratios vxy, vyz, and vzx of the laminated iron core to be tested 121 were set as follows:

Ex=Ex0=132 GPa, Ey=Ey0=220 GPa, and Ex=10 GPa;
Gxy=Gxy0=116 GPa; and
vxy=vxy0=0.623, and vyz=vzx=0, and for the remaining two shear moduli, Gyz=Gzx=G was set. Then, with various changes in the value of G used as a parameter, structural analysis was performed a plurality of times to obtain a relationship between the natural frequency of the deflection deformation first order mode and the parameter G, thereby creating the characteristic diagram illustrated in FIG. 9B.

Next, the characteristic diagram (FIG. 9C) illustrating the relationship between the average tightening pressure and the shear modulus G was created from the relationship between the natural frequency and the average tightening pressure illustrated in FIG. 9A and the relationship between the natural frequency and the shear modulus G illustrated in FIG. 9B regarding the deflection deformation first order mode displaced in the laminating direction of the laminated iron core to be tested 121.

Then, from the relationship between the average tightening pressure and the shear modulus G illustrated in FIG. 9C, a shear modulus of each of the upper yoke portion 22a, the lower yoke portion 22b, and the leg portions 22c was determined according to an average tightening pressure in the laminating direction on each of the upper yoke portion 22a, the lower yoke portion 22b, and the leg portions 22c of the laminated iron core 21 for three-phase three-legged transformers. Since the average tightening pressure on the upper yoke portion 22a and the lower yoke portion 22b of the laminated iron core 21 was 0.2 MPa, the shear modulus $Gyz=Gzx=0.25$ GPa was determined for the upper yoke portion 22a and the lower yoke portion 22b. Additionally, since the average tightening pressure on each leg portion 22c of the laminated iron core 21 was 0.12 MPa, $Gyz=Gzx=0.5$ GPa was determined for the each leg portion 22c.

Further, when the natural vibration analysis of the iron core for transformers is performed, the vibration modes as illustrated in FIG. 8 appear.

Here, as in the conventional example, assuming that the mechanical elastic coefficients of the iron core for transformers are equal to the mechanical elastic coefficients of the grain-orientated electrical steel sheet, the natural vibration analysis of the iron core for three-phase three-legged transformers having the shape illustrated in FIG. 2 was performed, as a result of which the natural frequencies were 1006 Hz for mode A and 2004 Hz for mode B, without appearance of the vibration mode C.

Next, the laminated iron core 21 for three-phase three-legged transformers having the shape illustrated in FIG. 2 was actually manufactured using grain-orientated electrical steel sheets having a sheet thickness of 0.3 mm. Then, a natural frequency measurement of the iron core was performed by excitation by an impact hammer. As a result, the three vibration modes A, B, and C illustrated in FIG. 8 were observed, and the measured natural frequencies were 141 Hz for mode A, 255 Hz for mode B, and 293 Hz for mode C.

Thus, the natural frequencies obtained by the conventional natural vibration analysis have resulted in a significant difference from the actually measured natural frequencies. This seems to be due to the fact that the conventional natural vibration analysis does not set the shear moduli in the two planes including the laminating direction of the laminated iron core in consideration of slippage between the laminated steel sheets.

Therefore, in the present embodiment, using the values of the elastic coefficients and the Poisson's ratios of the laminated iron core 21 obtained at the above-described steps, the natural vibration analysis of the laminated iron core 21 for three-phase three-legged transformers having the shape illustrated in FIG. 2 was performed by the structural analysis software installed in the vibration analysis device 10.

For the elastic coefficients and the Poisson's ratios of the laminated iron core 21, the values obtained at the above-described steps were used to perform calculation:

in the upper yoke portion 22a and the lower yoke portion 22b,

Elastic moduli: $Ex=Ex0=132$ GPa, $Ey=Ey0=220$ GPa, and $Ez=10$ GPa

Shear moduli: $Gxy=Gxy0=116$ GPa, and $Gyz=Gzx=0.25$ GPa

Poisson's ratios: $vxy=vxy0=0.623$, and $vyz=vzx=0$; and in each leg portion 22c, Elastic moduli: $Ex=Ex0=132$ GPa, $Ey=Ey0=220$ GPa, and $Ez=10$ GPa Shear moduli: $Gxy=Gxy0=116$ GPa, and $Gyz=Gzx=0.5$ GPa Poisson's ratios: $vxy=vxy0=0.623$, and $vyz=vzx=0$.

As a result, the natural frequencies were 148 Hz for mode A, 250 Hz for mode B, and 309 Hz for mode C. These values are in much better agreement with the actually measured natural frequencies, as compared to the results obtained by the conventional analysis method.

The above results have confirmed that, as compared to the conventional method, the vibration characteristics can be calculated with higher accuracy by determining the shear modulus $Gyz=Gzx=G$ in the elastic matrix [C] by the elastic matrix determination method according to the present embodiment and incorporating the determined shear modulus $Gyz=Gzx=G$ in the constitutive equation that is the above equation (5) to perform natural vibration analysis.

As described above, according to the present embodiment, the vibration test is performed while variously changing the average tightening pressure in the laminating direction of the produced laminated iron core to be tested 121 to measure the actual value of the natural frequency of the specific vibration mode, thereby obtaining the relationship between the natural frequency of the specific vibration mode and the average tightening pressure. Then, the structural analysis of the laminated iron core to be tested 121 is performed a plurality of times using the structural analysis software with the shear modulus G as the parameter to estimate the relationship between the natural frequency of the specific vibration mode and the shear modulus G considering slippage between the laminated steel sheets. In addition, the relationship between the average tightening pressure and the shear modulus G is obtained from the relationship between the natural frequency of the specific vibration mode and the average tightening pressure and the relationship between the natural frequency of the specific vibration mode and the shear modulus G. Then, using the relationship between the average tightening pressure and the shear modulus G, a shear modulus G of each of the upper yoke portion 22a, the lower yoke portion 22b, and the leg portions 22C is determined according to the average tightening pressure in the laminating direction on each of the upper yoke portion 22a, the lower yoke portion 22b, and the leg portions 22C of the laminated iron core 21 for three-phase three-legged transformers. As a result, the shear modulus $Gyz=Gzx=G$ can be set to a value considering the slippage between the laminated grain-orientated electrical steel sheets. Thus, by incorporating the determined shear modulus in the elastic matrix and performing vibration analysis, the vibration characteristics of the laminated iron core can be calculated with high accuracy.

Accordingly, when designing an iron core for three-phase three-legged transformers by using various electrical steel sheets, producing an iron core to be tested using the same electrical steel sheets and using the iron core to be tested to determine the elastic modulus Ez and the shear moduli Gyz=Gzx=G can determine a suitable elastic matrix, i.e., response function considering slippage between laminated steel sheets.

Furthermore, incorporating the determined shear modulus Gyz=Gzx=G in the elastic matrix and performing natural vibration analysis can calculate a natural frequency of each vibration mode of the iron core for three-phase three-legged transformers with high accuracy.

In addition, while the above embodiment has described the vibration analysis of the laminated iron core 21 for three-phase three-legged transformers, the present invention is not limited thereto. The present invention is also applicable to vibration analysis of laminated iron cores for three-phase five-legged transformers and other transformers.

REFERENCE SIGNS LIST

- 10: Vibration analysis device
- 11: CPU
- 12: Calculation processing device
- 13: Internal bus
- 14: Internal storage device
- 15: External storage device
- 16: Input device
- 17: Output device
- 18: Recording medium
- 21: Laminated iron core for three-phase three-legged transformers (laminated iron core for transformers)
- 22: Grain-orientated electrical steel sheet
- 22a: Upper yoke portion (yoke portion)
- 22b: Lower yoke portion (yoke portion)
- 22c: Leg portion
- 23a: Upper backing plate
- 23b: Lower backing plate
- 24a: Bolt
- 24b: Bolt
- 25a: Nut
- 25b: Nut
- 25c: Glass tape
- 121: Laminated iron core to be tested
- 122: Grain-orientated electrical steel sheet
- 123: Backing plate
- 124: Bolt
- 125: Nut
- 126: Clamp

The invention claimed is:

1. An elastic matrix determination method comprising:
    when performing a vibration analysis by a vibration analysis device of a laminated iron core formed by laminating steel sheets using a constitutive equation representing a stress-strain relationship in a matrix representation, determining by a calculation processing device installed in the vibration analysis device a shear modulus in two planes including a laminating direction of the laminated iron core included in an elastic matrix in the constitutive equation according to an average tightening pressure in the laminating direction of the laminated iron core.

2. The elastic matrix determination method according to claim 1, wherein the laminated iron core is a laminated iron core for transformers formed by laminating a plurality of electrical steel sheets; and wherein the average tightening pressure is an average tightening pressure in the laminating direction on each of yoke portions and leg portions of the laminated iron core for transformers.

3. The elastic matrix determination method according to claim 2, wherein the yoke portions and the leg portions of the laminated iron core for transformers are each given a different shear modulus as having different mechanical property values.

4. The elastic matrix determination method according to claim 3, including
    a first step of producing a laminated iron core to be tested formed by laminating steel sheets,
    a second step of performing a vibration test while variously changing the average tightening pressure in the laminating direction of the produced laminated iron core to be tested to measure an actual value of a natural frequency of a specific vibration mode and obtaining a relationship between the natural frequency of the specific vibration mode and the average tightening pressure,
    a third step of performing a structural analysis of the laminated iron core to be tested a plurality of times using structural analysis software with the shear modulus as a parameter to estimate a relationship between the natural frequency of the specific vibration mode and the shear modulus considering slippage between the laminated steel sheets,
    a fourth step of obtaining a relationship between the average tightening pressure and the shear modulus from the relationship between the relationship between the natural frequency of the specific vibration mode and the average tightening pressure obtained at the second step and the relationship between the natural frequency of the specific vibration mode and the shear modulus estimated at the third step, and
    a fifth step of using the relationship between the average tightening pressure and the shear modulus obtained at the fourth step to determine the shear modulus of each of the yoke portions and the leg portions depending on the average tightening pressure in the laminating direction on each of the yoke portions and the leg portions of the laminated iron core for transformers.

5. A vibration analysis method for a laminated iron core, the method comprising:
    performing a vibration analysis by a vibration analysis device of a laminated iron core formed by laminating steel sheets using a constitutive equation representing a stress-strain relationship in a matrix representation using a response function,
    wherein the constitutive equation include an elastic matrix that incorporates a shear modulus in two planes including a laminating direction of the laminated iron core, the shear modulus being determined by a calculation processing device installed in the vibration analysis device according to an average tightening pressure in the laminating direction of the laminated iron core.

6. The vibration analysis method according to claim 5, wherein the laminated iron core is a laminated iron core for transformers formed by laminating a plurality of electrical steel sheets; and wherein the average tightening pressure is an average tightening pressure in the laminating direction on each of yoke portions and leg portions of the laminated iron core for transformers.

7. The vibration analysis method according to claim 6, wherein the yoke portions and leg portions of the laminated iron core for transformers each have a different determined shear modulus as having different mechanical property values.

8. The vibration analysis method according to claim 7, wherein each shear modulus of the yoke portions and the leg portions of the laminated iron core for transformers is determined according to a method comprising:
- a first step of producing a laminated iron core to be tested formed by laminating steel sheets,
- a second step of performing a vibration test while variously changing the average tightening pressure in the laminating direction of the produced laminated iron core to be tested to measure an actual value of a natural frequency of a specific vibration mode and obtaining a relationship between the natural frequency of the specific vibration mode and the average tightening pressure,
- a third step of performing a structural analysis of the laminated iron core to be tested a plurality of times using structural analysis software with the shear modulus as a parameter to estimate a relationship between the natural frequency of the specific vibration mode and the shear modulus considering slippage between the laminated steel sheets,
- a fourth step of obtaining a relationship between the average tightening pressure and the shear modulus from the relationship between the relationship between the natural frequency of the specific vibration mode and the average tightening pressure obtained at the second step and the relationship between the natural frequency of the specific vibration mode and the shear modulus estimated at the third step, and
- a fifth step of using the relationship between the average tightening pressure and the shear modulus obtained at the fourth step to determine the shear modulus of each of the yoke portions and the leg portions depending on the average tightening pressure in the laminating direction on each of the yoke portions and the leg portions of the laminated iron core for transformers.

* * * * *